United States Patent
Rettig

(10) Patent No.: US 9,481,407 B2
(45) Date of Patent: Nov. 1, 2016

(54) DRAG REDUCTION SYSTEM

(71) Applicant: Alan Rettig, Munford, TN (US)

(72) Inventor: Alan Rettig, Munford, TN (US)

(*) Notice: Subject to any disclaimer, the term of this patent is extended or adjusted under 35 U.S.C. 154(b) by 0 days.

(21) Appl. No.: 14/549,760

(22) Filed: Nov. 21, 2014

(65) Prior Publication Data

US 2015/0076860 A1    Mar. 19, 2015

Related U.S. Application Data

(63) Continuation-in-part of application No. 13/958,811, filed on Aug. 5, 2013, now abandoned.

(51) Int. Cl.
    *B62D 35/00* (2006.01)
    *B62D 35/02* (2006.01)

(52) U.S. Cl.
    CPC ........... *B62D 35/001* (2013.01); *B62D 35/02* (2013.01)

(58) Field of Classification Search
    CPC ...................... B62D 35/00; B62D 35/001
    USPC .................. 296/180.1, 180.4, 180.5
    See application file for complete search history.

(56) References Cited

U.S. PATENT DOCUMENTS

| | | |
|---|---|---|
| 4,486,046 A * | 12/1984 | Whitney et al. ........... 296/180.4 |
| 5,280,990 A | 1/1994 | Rinard |
| 6,079,769 A | 6/2000 | Fannin et al. |
| 2008/0061596 A1* | 3/2008 | Brown et al. .............. 296/180.1 |
| 2010/0066123 A1 | 3/2010 | Ortega et al. |
| 2011/0042998 A1 | 2/2011 | Rinehart et al. |
| 2011/0042999 A1 | 2/2011 | Dayton |
| 2011/0068605 A1 | 3/2011 | Domo et al. |
| 2011/0148140 A1* | 6/2011 | Benton ...................... 296/180.1 |
| 2011/0272964 A1 | 11/2011 | Henderson et al. |

* cited by examiner

*Primary Examiner* — Joseph D Pape
(74) *Attorney, Agent, or Firm* — David J Kreher

(57) ABSTRACT

A method of reducing drag on the underside and rear wheels of a commercial vehicle which is a drag reduction system including an airfoil designed to mount on the underside or slider assembly of a commercial vehicle that would reduce the air drag forces and improve fuel economy for the vehicle, a hydraulic system that operates to adjust the angle of the airfoil, and at least two sets of controllers, one controller that operates automatically in conjunction with the speed of the vehicle and a second controller that allows the operator to manually adjust the angle of the airfoil from within the driver's compartment. The purpose of the drag reduction system is to provide a more fuel efficient design for commercial vehicle applications, resulting in fuel cost savings for the vehicle operation.

17 Claims, 10 Drawing Sheets

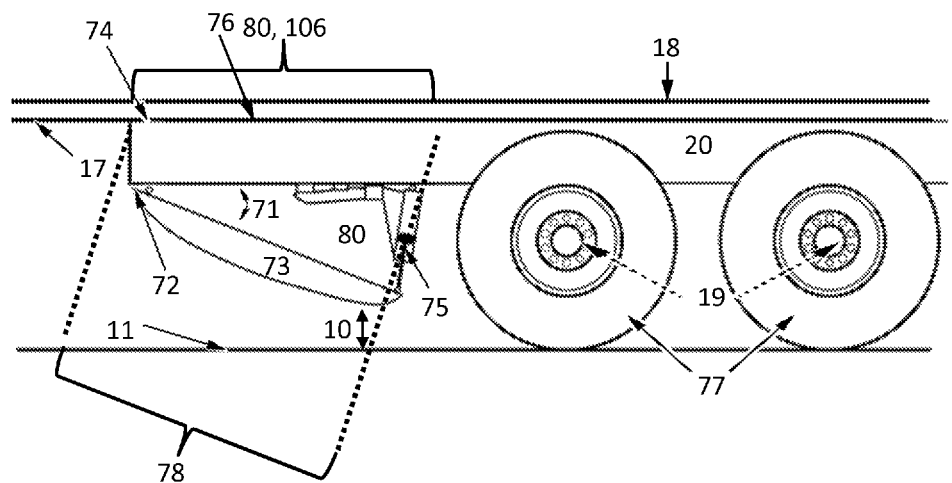
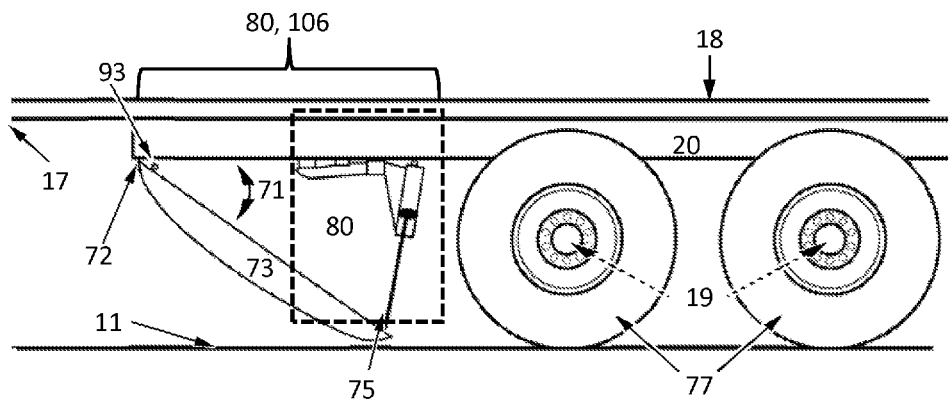

DRAG REDUCTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

A drag reduction system to reduce the drag on a commercial vehicle that is located on the underside of a commercial vehicle, in the area of the rear wheels. As a commercial vehicle moves wind rushes under the vehicle, toward the rear wheels, and the force of the wind that collides with the rear wheels impedes the forward movement of the commercial vehicle and causes the commercial vehicle to burn more fuel. The drag reduction system diverts this wind down from the underside of the commercial vehicle, out from the center of the commercial vehicle to the outside and around the rear wheels of the commercial vehicle and by doing so increases fuel efficiency. In addition, the drag reduction system is adjustable, automatically as the commercial vehicle is moving, or the automatic system can be manually overridden.

BACKGROUND OF THE INVENTION

This application a request for continued examination of U.S. patent application Ser. No. 14/549,760, which is a continuation in part of U.S. patent application Ser. No. 13/958,811 filed Aug. 5, 2013. The benefit of the earlier filing date of the aforementioned U.S. patent application Ser. No. 13/958,811 is hereby claimed.

A drag reduction system that relates to the reduction of drag forces down and away from the rear wheels of commercial vehicles, thus increasing fuel efficiency. Several attempts have been made to develop a system to decrease drag around the rear wheels of vehicles including the installation of side paneling extending closer to the ground as well as airfoils attempting to angle the wind away from the rear wheels.

In U.S. Pat. No. 6,079,769, Fannin et al., discloses a retractable air turbulence device attached to the lower side of a vehicle frame that can be raised and lowered to deflect air around the wheels, however, the present disclosure adjusts automatically.

In U.S. Patent Application No.: US 2010/0066123, Ortega et al., discloses trailer wheel fairings before and possibly after the rear wheels of a trailer to reduce aerodynamic drag from the wheel sets, affixed to the underside of the trailer, however the present discloser is an adjustable system.

In U.S. Patent Application US 2011/0042999, Dayton discloses a system reducing aerodynamic drag on vehicles that includes a series of convex outward airfoils to deflect air around the rear wheels of a trailer, connected to the axle assembly ahead of the first and second tires, however, the present disclosure is a single airfoil and adjustable.

In U.S. Patent Application No.: US 2011/0042998, Rinehart et al., discloses an adjustable air-deflecting panel for a vehicle that includes an adjustable air-deflecting panel that is mounted on the sides of a vehicle, where the angle of deflection can be modified to increase or decrease deflection, whereas the present disclosure is designed to go on the underside of the vehicle.

In U.S. Patent Application No.: US 2011/006805, Domo et al. discloses an undercarriage fairing that includes an airstream deflector attached to the undercarriage of a trailer angled away from the bottom of the trailer to deflect air down and away from the rear wheels, whereas the present disclosure is adjustable.

In U.S. Patent Application No.: 2011/0272964, Henderson, et al., discloses devices and methods for reducing vehicle drag, including air stream deflecting devices positioned in front of the rear wheels, whereas the present disclosure is adjustable.

In U.S. Pat. No. 5,280,990, Rinard, discloses devices and methods for reducing vehicle drag, including air stream deflecting devices positioned in front of the rear wheels, whereas the present disclosure is adjustable.

In U.S. Pat. No. 6,079,769, Fannin, et al., discloses devices and methods for reducing vehicle drag, including air stream deflecting devices positioned in front of the rear wheels, whereas the present disclosure is adjustable.

In U.S. Pat. No. 4,486,046, Whitney, et al., discloses a commercial vehicle with an airfoil positioned in front of the rear wheels of the vehicle, with hinges and a pneumatic adjustment system for adjusting the angle between the airfoil and the underside of the commercial vehicle, petitioner would respond that discloses an airfoil "[p]referably . . . mounted approximately midway between the rear tires of the tractor and the following tires of the trailer of the vehicle . . . " and is designed to deflect the air "into the lower portion of the following tires and axle of the vehicle". And further, "[t]he general purpose of the outboard lateral deflector is to deflect the airstream into the area of the following tires and the primary purpose of the inboard lateral deflectors is to outwardly deflect the airstream toward the following tires and somewhat away from the "tunnel" between the following tires". Whereas in the present disclosure the airfoil is positioned in the area of the rear wheels so that the air flow can be redirected away from the center of the vehicle, down, out and around the rear wheels.

In U.S. Patent Application No.: 2008/0061596, Brown, et al., discloses an airfoil adjustment system for an airfoil mounted on a vehicle top rear of an automobile, where the adjustment system is a hydraulic system with a containment means, hoses, pump, valve and cylinders that may indicate that the use of hydraulic cylinders is common in the industry in association with the use of airfoils. However, the combination of Whitney et al. in view of Brown, et al. results in an adjustable airfoil for use in diverting airflow away from the underside of a tractor trailer, at the rear wheels of the trailer and does not obviously produce the present disclosure, as the present disclosure is a hydraulically adjustable airfoil positioned near the rear wheels of a trailer to adjust the flow of air around and away from the rear wheels.

In U.S. Patent Application No.: 2011/0148140, Benton discloses an airfoil with a vehicle wherein the airfoil on the top, rear of a commercial vehicle that may be either manually or automatically adjusted based on the speed of the vehicle. However, the combination of Whitney et al. in view of Brown, et al. and further in view of Benton still only results in the production of an automatically adjustable airfoil designed to direct airflow away from the underside of a commercial vehicle and toward the rear wheels, whereas the present disclosure reveals an airfoil in the area of the rear wheels that directs the airflow around and away from the rear wheels of the commercial vehicle.

SUMMARY OF THE INVENTION

A drag reduction system to reduce the drag on a commercial vehicle that is located on the underside of a commercial vehicle, in the area of the rear wheels. As a commercial vehicle moves wind rushes under the vehicle, toward the rear wheels, and the force of the wind that collides with the rear wheels impedes the forward movement of the commercial vehicle and causes the commercial vehicle to burn more fuel. The drag reduction system diverts this wind down from the underside of the commercial vehicle, out from the center of the commercial vehicle to the outside and around the rear wheels of the commercial vehicle and by doing so increases fuel efficiency. The present disclosure reveals a drag reduction system comprising an airfoil and a hydraulic adjustment system for adjusting the height of the airfoil relative to the ground surface.

There are two types of commercial vehicles for which this drag reduction system is designed. In commercial vehicle type 1, the rear wheel and axle system is attached to the underside of the commercial vehicle in a fixed location. In commercial vehicle type 2, the rear wheels and axle system of the commercial vehicle is attached to a slider, or adjustable commercial vehicle trailer axle and suspension assembly, and that slider is the attached to the underside of the commercial vehicle in such a fashion that the position of the slider can be adjusted relative to the rest of the trailer to allow for weight distribution. There are two possible ways the drag reduction system is attached to the commercial vehicle. First, directly to the slider. Second, a plurality of extensions that are attached to the slider such that, as the slider moves, the plurality of extensions move, maintaining the distance between the drag reduction system and the rear wheels.

AMENDED BRIEF DESCRIPTION OF THE SEVERAL VIEWS OF THE DRAWING

FIG. 5C is a side view of the drag reduction system for a second type of commercial vehicle where the drag reduction system is attached to the slider of a commercial vehicle with the airfoil raised away from the ground;

FIG. 5D is a side view of the drag reduction system for the second type of commercial vehicle where the drag reduction system is attached to the slider of a commercial vehicle with the airfoil fully extended toward the ground;

Figure 1:
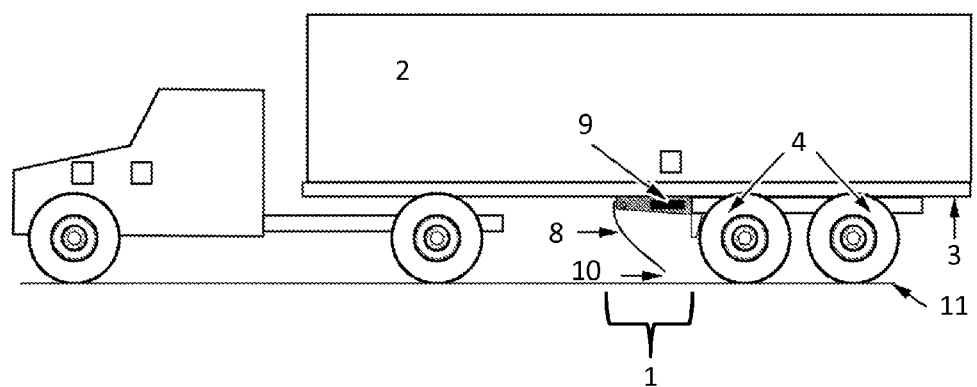
FIG. 1 is a side view of a commercial vehicle with the drag reduction system.
Figure 2:
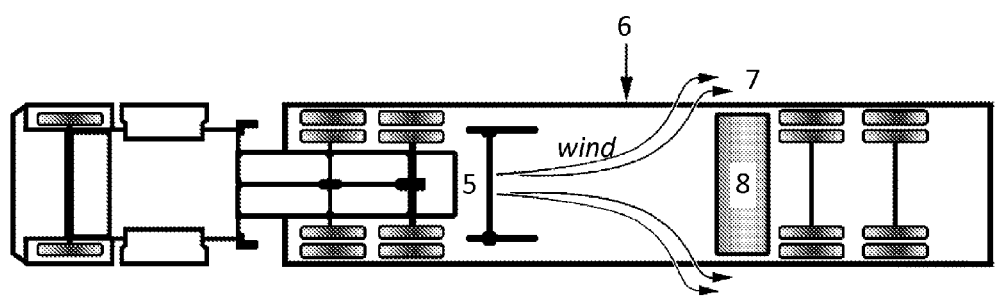
FIG. 2 is a view of the underside of a commercial vehicle with the drag reduction system, indicating the effect the drag reduction system has on airflow.
Figure 3A:
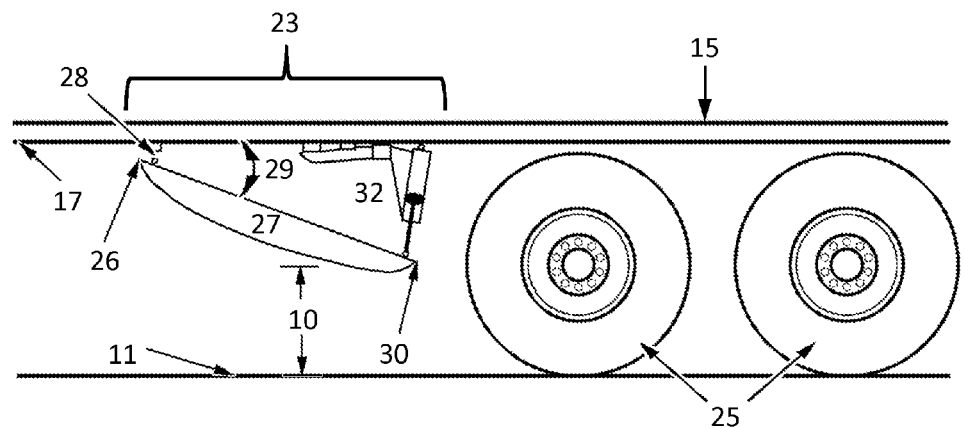
FIG. 3A is a side view of the drag reduction system for a first type of commercial vehicle where the drag reduction system is attached to the underside of a commercial vehicle with the airfoil raised away from the ground.
Figure 3B:
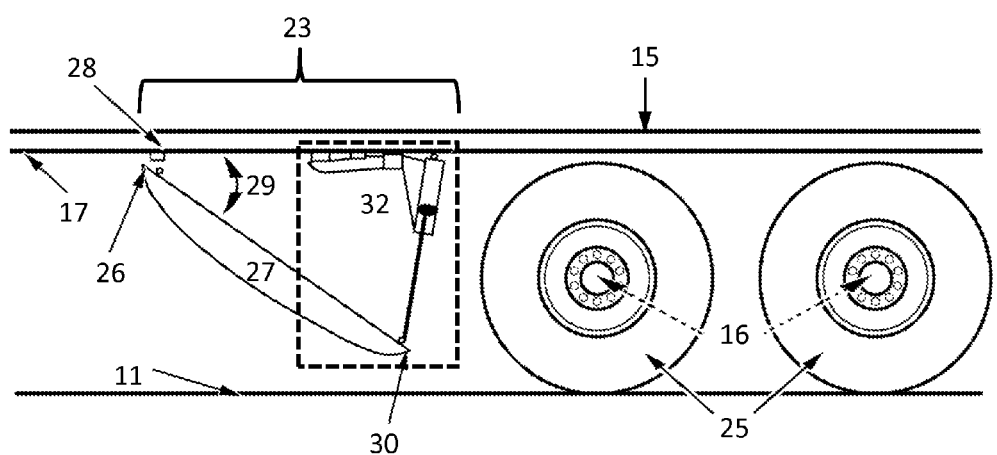
FIG. 3B is a side view of the drag reduction system for the first type of commercial vehicle where the drag reduction system is attached to the underside of a commercial vehicle with the airfoil fully extended toward the ground.
Figure 4:
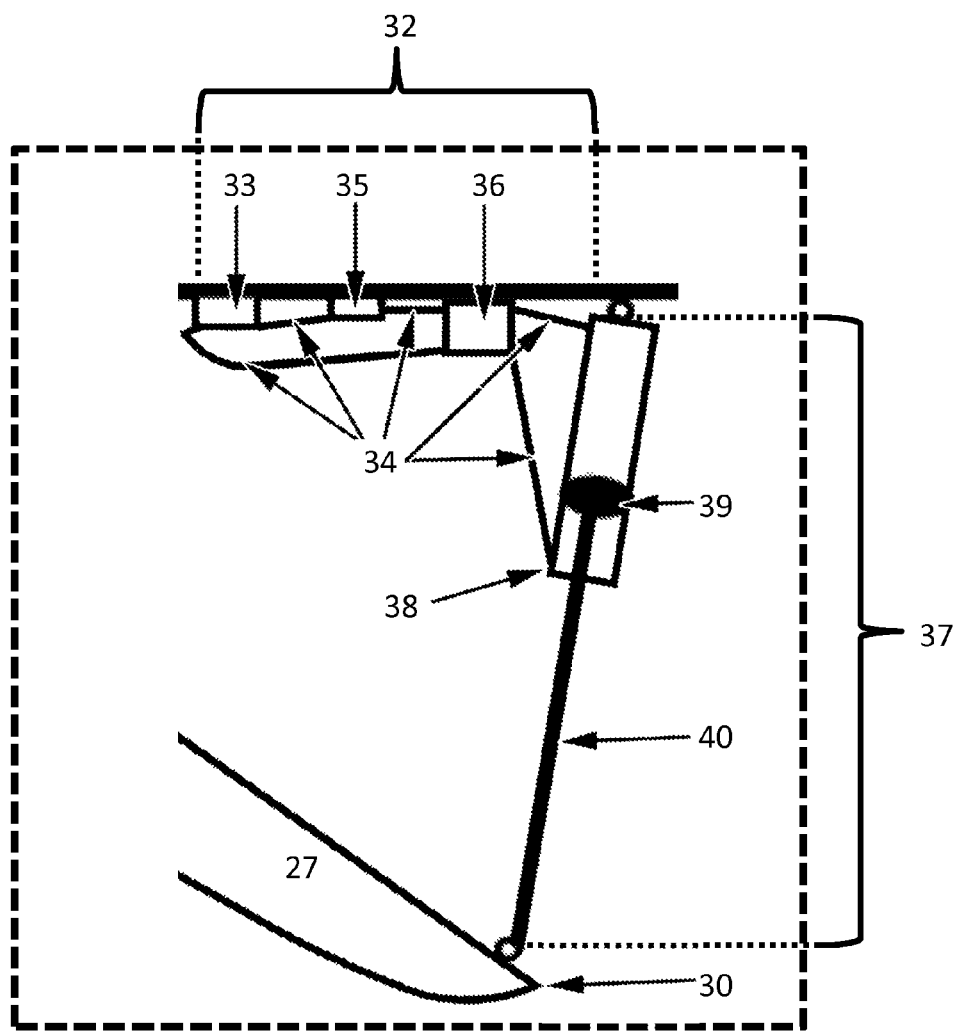
FIG. 4 is an expansive view of the hydraulic system for the drag reduction system for the first type of commercial vehicle comprising a hydraulic tank, a plurality of hydraulic hoses, a hydraulic pump, a valve and a plurality of hydraulic cylinders, where each hydraulic cylinder comprises a hydraulic ram and an arm extending from the hydraulic ram through the hydraulic cylinder.
Figure 5A:
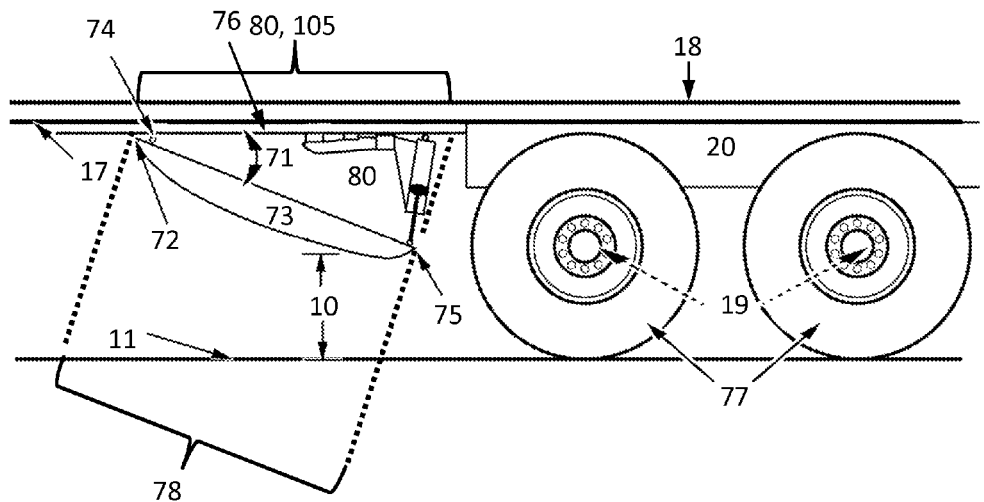
FIG. 5A is a side view of the drag reduction system for a second type of commercial vehicle where the drag reduction system is attached to a plurality of extensions that are attached to the slider of a commercial vehicle with the airfoil raised away from the ground.
Figure 5B:
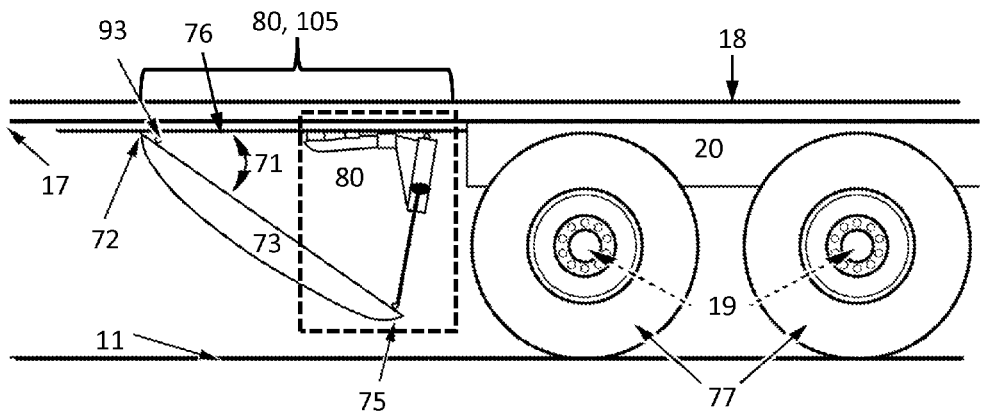
FIG. 5B is a side view of the drag reduction system for the second type of commercial vehicle where the drag reduction system is attached to a plurality of extensions that are attached to the slider of a commercial vehicle with the airfoil fully extended toward the ground.
Figure 6:
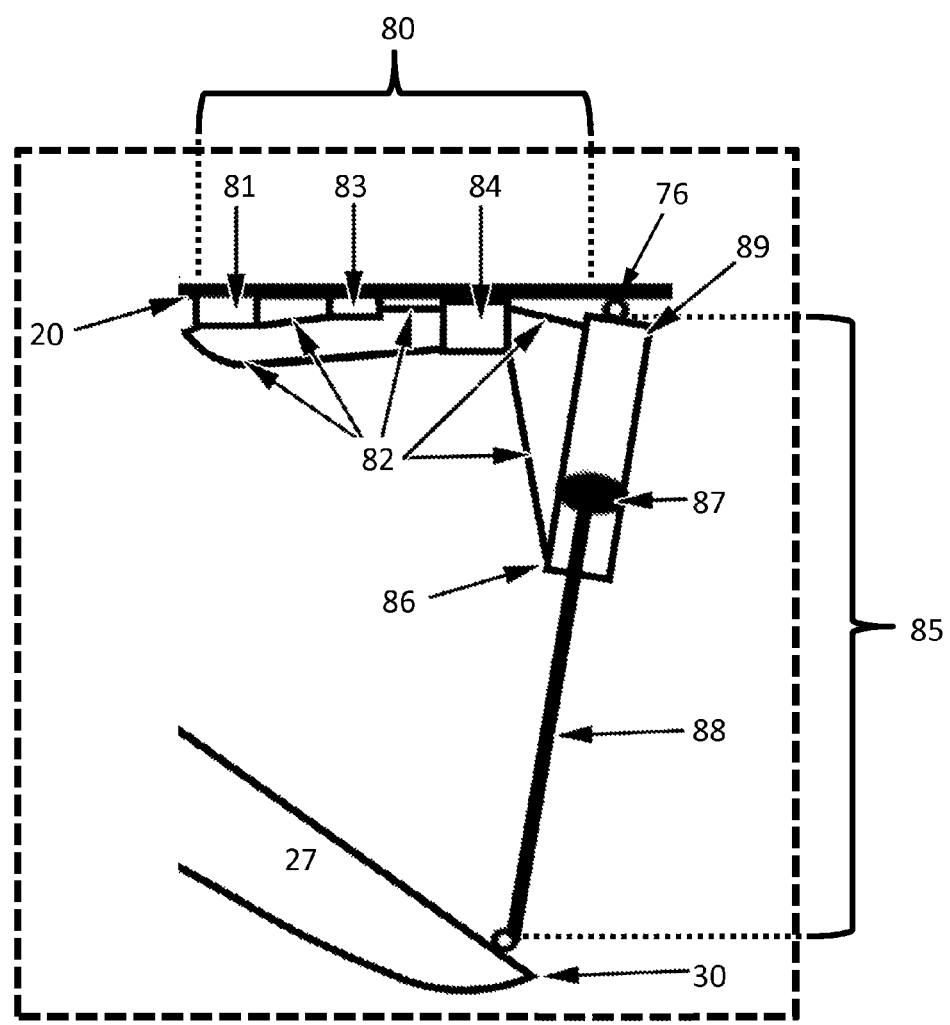
FIG. 6 is an expansive view of the hydraulic system for the drag reduction system for the second type of commercial vehicle comprising a hydraulic tank, a plurality of hydraulic hoses, a hydraulic pump, a valve and a plurality of hydraulic cylinders, where each hydraulic cylinder comprises a hydraulic ram and an arm extending from the hydraulic ram through the hydraulic cylinder.
Figure 7:
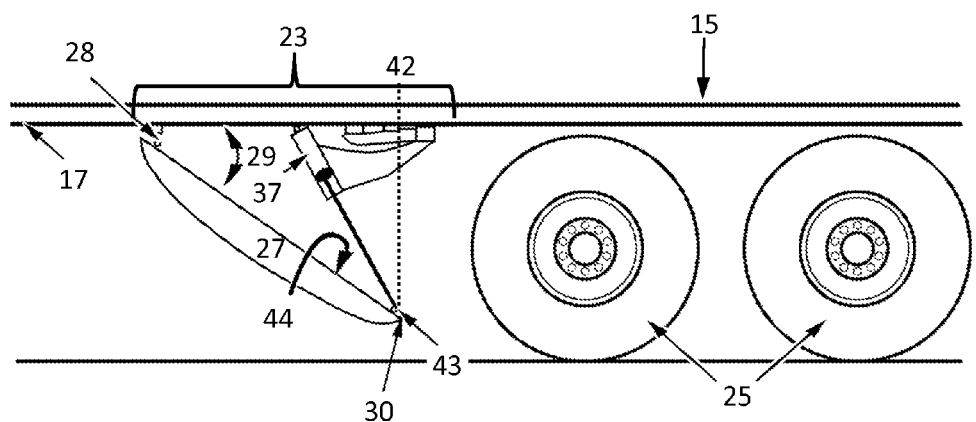
Figure 8:
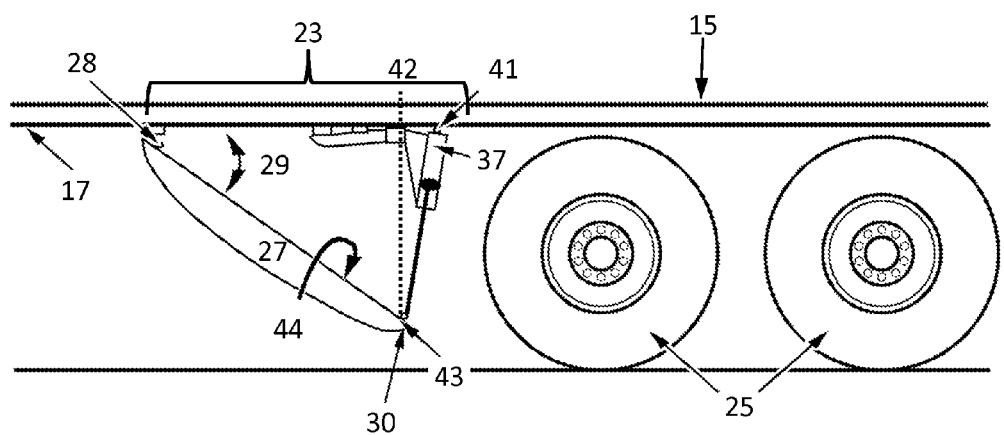
Figure 9:
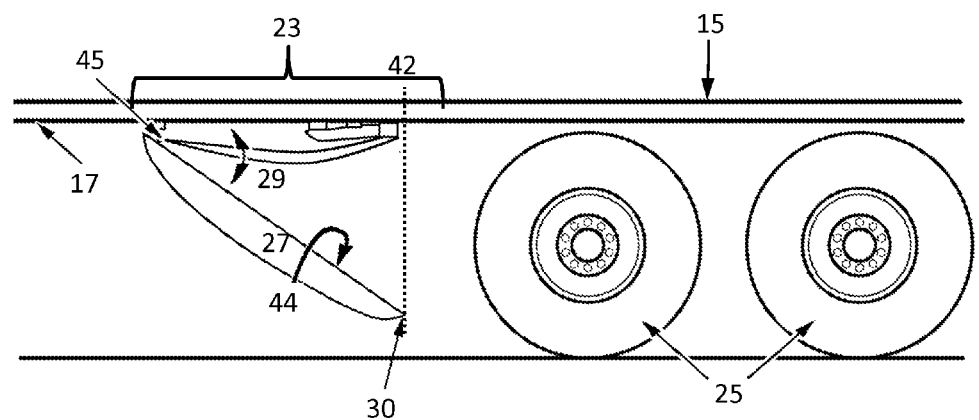
Figure 10:
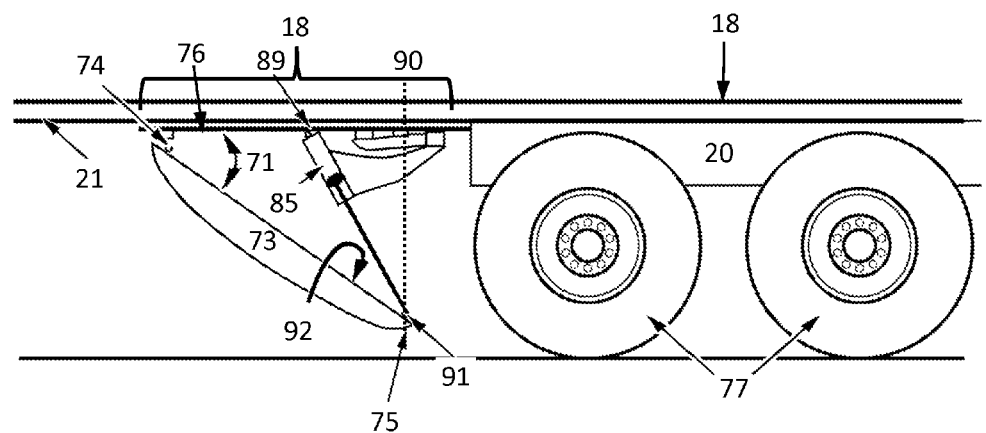
Figure 11:
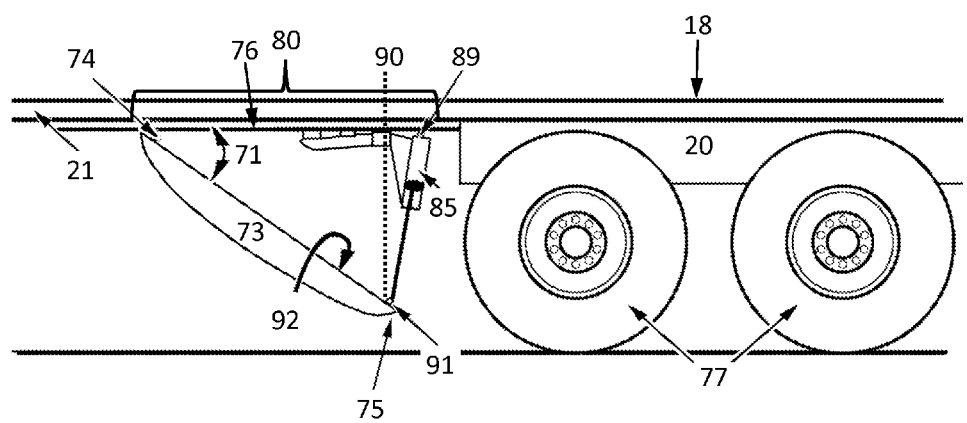
Figure 12:
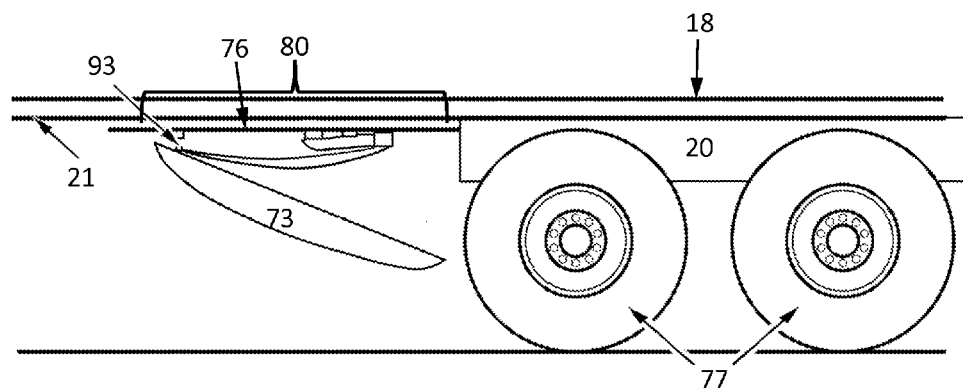
Figure 13:
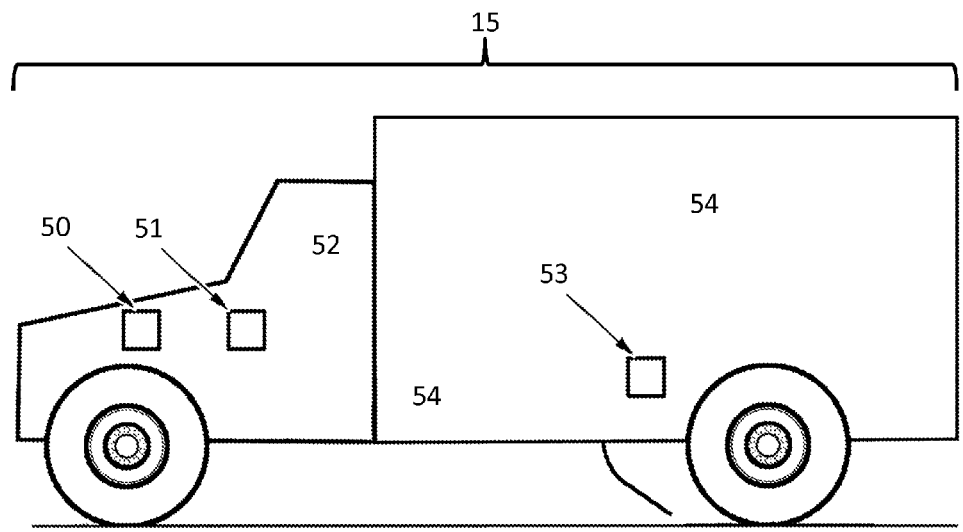
Figure 14:
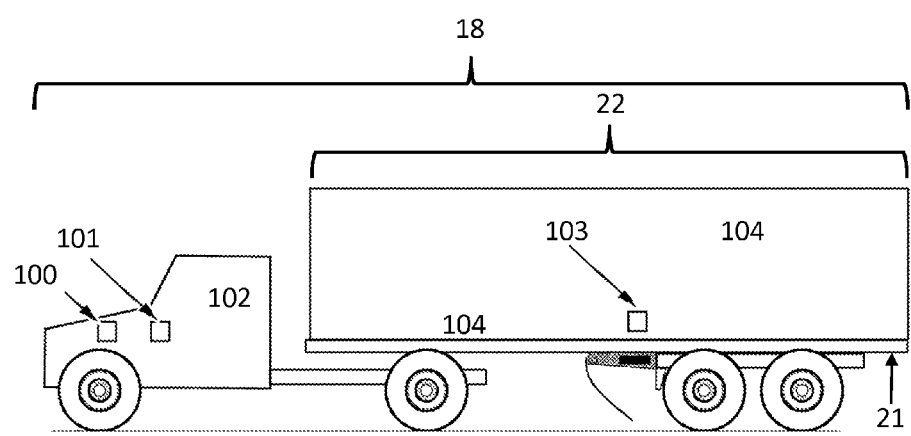

FIG. 7 is a side view of the first type of commercial vehicle where one end of each of the plurality of hydraulic cylinders is attached to the underside of the commercial vehicle between the plurality of hinges and the point directly above the trailing edge of the airfoil, while the end of each arm that extends from the hydraulic cylinders is attached to the airfoil in the area of the edge opposite the plurality of hinges;

FIG. 8 is a side view of the first type of commercial vehicle where one end of each of the plurality of hydraulic cylinders is attached to the underside of the commercial vehicle between the point directly above the trailing edge of the airfoil and the rear wheels, while the end of each arm that extends from the hydraulic cylinders is attached to the airfoil in the area of the edge opposite the plurality of hinges;

FIG. 9 is a side view of the first type of commercial vehicle where each of the plurality of hydraulic cylinders is attached to the underside of the commercial vehicle at the plurality of hinges and the plurality of hinges are replaced by hydraulicly adjustable hinges;

FIG. 10 is a side view of the second type of commercial vehicle where one end of each of the plurality of hydraulic cylinders is attached to the slider of the commercial vehicle between the plurality of hinges and the point directly above the trailing edge of the airfoil, while the end of each arm that extends from the hydraulic cylinders is attached to the airfoil in the area of the edge opposite the plurality of hinges;

FIG. 11 is a side view of the second type of commercial vehicle where one end of each of the plurality of hydraulic cylinders is attached to the slider of the commercial vehicle between the point directly above the trailing edge of the airfoil and the rear wheels, while the end of each arm that extends from the hydraulic cylinders is attached to the airfoil in the area of the edge opposite the plurality of hinges;

FIG. 12 is a side view of the second type of commercial vehicle where each of the plurality of hydraulic cylinders is attached to the slider of the commercial vehicle at the plurality of hinges and the plurality of hinges are replaced by hydraulically adjustable hinges;

FIG. 13 is a theoretical image of the first embodiment for a commercial vehicle with the rear wheels in a fixed location, indicating the location of the first controller within the engine compartment of the commercial vehicle to refer to the first controller being connected to the speedometer, the location of the second controller within the cab of the commercial vehicle so that the operator can access and control the independent hydraulic system, and the third controller, located outside of the commercial vehicle in the area of the rear wheels; and FIG. 14 is a theoretical image of the second embodiment for a commercial vehicle with the rear wheels attached to a slider, indicating the location of the first controller within the engine compartment of the commercial vehicle to refer to the first controller being connected to the speedometer, the location of the second controller within the cab of the commercial vehicle so that the operator can access and control the independent hydraulic system, and the third controller, located outside of the commercial vehicle in the area of the rear wheels.

DETAILED DESCRIPTION OF THE INVENTION

A drag reduction system 1 to reduce the drag on a commercial vehicle 2 that is located on the underside 3 of a commercial vehicle 2, in the area of the rear wheels 4 so as to divert wind that originally is directed toward the rear wheels 4 down from the underside 3 of the commercial vehicle 2, out from the center 5 of the commercial vehicle 2 to the outside 6 and around 7 the rear wheels 4 of the commercial vehicle 2. The present disclosure reveals a drag reduction system 1 comprising an airfoil 8 and a hydraulic adjustment system 9 for adjusting the height 10 of the airfoil 8 relative to the ground 11.

The hydraulic adjustment system 9 as described can be applied to two different preferred embodiments of commercial vehicles 2, commercial vehicle type one 15, where the rear wheel and axle system 16 are attached to the underside 17 of the commercial vehicle in a fixed location, and commercial vehicle type two 18, where the rear wheels and axle system 19 of the commercial vehicle are attached to a slider 20, or adjustable commercial vehicle trailer axle and suspension assembly, and that slider 20 is attached to the underside 21 of the commercial vehicle 18 in such a fashion that the position of the slider 20 can be adjusted relative to the rest of the trailer 22 to allow for weight distribution.

In commercial vehicle type one 15, the drag reduction system 23 is attached to the underside of a commercial vehicle 24 just forward of the rear wheels 25. In particular, the top edge 26 of the airfoil 27 is attached to a plurality of hinges 28 that are attached to the underside of the commercial vehicle 24 far enough in front of the rear wheels 25 so as not to interfere with the wheels 25 but close enough to the rear wheels 25 so as to minimize the amount of air that reaches the rear wheels 25 while the commercial vehicle 15 is in operation. The plurality of hinges 28 allow the angle 29 of the airfoil 27 to be adjusted, which causes the edge opposite 30 of the plurality of hinges 28 to be raised and lowered relative to the ground 11, to protect the drag reduction system 23 from hazards or to increase efficiency.

The first embodiment of the hydraulic adjustment system 32 for commercial vehicle type one 15 comprises a hydraulic containment means 33, a plurality of hydraulic hoses 34, a hydraulic pump 35, a valve 36, and a plurality of hydraulic cylinders 37, where each hydraulic cylinder 37 comprises a cylinder casing 38, a hydraulic ram 39 and an arm 40 extending from the hydraulic ram 39 through the end of the cylinder casing 38, where, as the hydraulic ram is adjusted by the movement of the hydraulic fluid, the arm 40 is extended and retracted.

In the hydraulic adjustment system 32, the containment means 33, hydraulic pump 35 and the valve 36 are attached to the underside 17 of commercial vehicle type one 15. The plurality of hydraulic cylinders 37 facilitate the adjustment of the airfoil 27 when positioned in any one of three locations as described below. The plurality of hydraulic hoses 34 extend from the hydraulic containment means 33 to the hydraulic pump 35, and from the hydraulic pump 35 to the valve 36. From the valve 36, the plurality of hydraulic hoses 34 extend to each end of the plurality of the hydraulic cylinders 37 such that in one operational mode hydraulic fluid flows from the valve 36 to the plurality of hydraulic cylinders 37 and the hydraulic fluid pushes the hydraulic ram 39 so that the arm 40 is extended from the cylinder casing 38, while in a second operational mode hydraulic fluid flows from the valve 36 to the plurality of hydraulic cylinders 37 and the hydraulic fluid pushes the hydraulic ram 39 so that the arm is retracted into the cylinder casing 38. The plurality of hydraulic hoses 34 also extends back to the hydraulic containment means 33 to allow hydraulic fluid to flow back to the hydraulic containment means 33.

In the first embodiment of the position of the plurality of hydraulic cylinders 37, one end 41 of each of the plurality of hydraulic cylinders 37 is attached to the underside 17 of the commercial vehicle 15 between the plurality of hinges 28 and the point 42 directly above the edge opposite 30 the plurality of hinges 28 of the airfoil 27, while the end of each arm 43 that extends from the cylinder casing 38 is attached to the airfoil 27 in the area of the edge opposite 30 the plurality of hinges 28, where generally there are two hydraulic cylinders 37 and said hydraulic cylinders 37 are attached near the exterior edges 44 along the edge opposite 30 the plurality of hinges 28, but where the quantity of hydraulic cylinders 37 may vary and location of the attachment of the hydraulic cylinders 37 may vary anywhere along the edge opposite 30 the plurality of hinges 28 or between the edge opposite 30 the plurality of hinges 28 and the plurality of hinges 28.

In the second embodiment of the position of the plurality of hydraulic cylinders 37, one end 41 of each of the plurality of hydraulic cylinders 37 is attached to the underside 17 of the commercial vehicle 15 between the point 42 directly above the edge opposite 30 the plurality of hinges 28 of the airfoil 27 and the rear wheels 25, while the end of each arm 40 that extends from the cylinder casing 38 is attached to the airfoil 27 in the area of the edge opposite 30 the plurality of hinges 28, where generally there are two hydraulic cylinders 37 and said hydraulic cylinders 37 are attached near the exterior edges 44 along the edge opposite 30 the plurality of hinges 28, but where the quantity of hydraulic cylinders 37 may vary and location of the attachment of the hydraulic cylinders 37 may vary anywhere along the edge opposite 30 the plurality of hinges 28 or between the edge opposite 30 the plurality of hinges 28 and the plurality of hinges 28.

In the third embodiment of the position of the plurality of hydraulic cylinders 37, the plurality of hinges 28 is replaced by a plurality of hydraulically adjustable hinges 45, which then adjust the angle 29 between the airfoil 27 and the underside 17 of the commercial vehicle 15.

The first embodiment of the drag reduction system 23 is operated either with a first controller 50 automatically, manually with a second controller 51 located in the driver's compartment 52 of the commercial vehicle 15, or manually with a third controller 53 located on the exterior 54 of the commercial vehicle 15 in the area of the rear wheels 25. The first controller 50 operates during regular operation of the commercial vehicle 15, where the angle 29 of the airfoil 27 is automatically adjusted according to the speed of the commercial vehicle 15. As speed increases, the angle 29 between the airfoil 27 and the underside 17 of the commercial vehicle 15 increases, adjusting the edge opposite 30 the plurality of hinges 28 of the airfoil 27 closer to the ground 11, maximizing the amount of air diverted around the rear wheels 25, thus increasing efficiency. As speed of the commercial vehicle 15 decreases, the angle 29 of the airfoil 27 decreases, decreasing efficiency but protecting the drag reduction system 23 from road hazards. The second controller 51 is a manual system that overrides the first controller 50 and allows the hydraulic adjustment system 32 to be manually adjusted by the operator from within the driver's compartment 52 of the commercial vehicle 15. An additional embodiment involves a third controller 53 located on the exterior 54 of the commercial vehicle 15 in the area of the rear wheels 25, said third controller 53 is a manual system that allows an operator to adjust the angle 29 between the airfoil 27 and the underside 17 of the commercial vehicle 15, which then raises or lowers the edge opposite 30 the plurality of hinges 28.

In commercial vehicle type two 18, the drag reduction system 78 is attached to the slider 20 in one of two fashions. In the first attachment method 105 to slider 20 the drag reduction system 78 is attached directly to the slider 20. In a second attachment method 106 to the slider 20, the drag reduction system 78 is attached to a plurality of extensions 76 that are attached to the slider 20, wherein, as the slider is adjusted the drag reduction system 78 also moves with the slider 20. In particular, in the first attachment method 105 to the slider 20, the top edge 72 of the airfoil 73 is attached to a plurality of hinges 74 which are attached to the slider 20 of the commercial vehicle 18 far enough in front of the rear wheels 77 so as not to interfere with the wheels 77 but close enough to the rear wheels 77 so as to minimize the amount of air that reaches the rear wheels 77 while the commercial vehicle 18 is in operation. The plurality of hinges 74 allow the angle 71 of the airfoil 73 to be adjusted, which causes the edge opposite 75 of the plurality of hinges 74 to be raised and lowered relative to the ground 11, to protect the drag reduction system 78 from hazards or to increase efficiency. In addition, the hydraulic adjustment system 80 is attached to the slider 20.

In the second attachment method 106 to the slider 20, the top edge 72 of the airfoil 73 is attached to a plurality of extensions 76 that are attached to the slider 20, whereby the airfoil 73 is attached to the plurality of extensions 76 by a plurality of hinges 74 so that the airfoil is far enough in front of the rear wheels 77 so as not to interfere with the wheels 77 but close enough to the rear wheels 77 so as to minimize the amount of air that reaches the rear wheels 77 while the commercial vehicle 18 is in operation. The plurality of hinges 74 allow the angle 71 of the airfoil 73 to be adjusted, which causes the edge opposite 75 of the plurality of hinges 74 to be raised and lowered relative to the ground 11, to protect the drag reduction system 78 from hazards or to increase efficiency. In addition, the hydraulic adjustment system 80 is attached to the plurality of extensions 76.

The first embodiment of the hydraulic adjustment system 80 for commercial vehicle type two 18 comprises a hydraulic containment means 81, a plurality of hydraulic hoses 82, a hydraulic pump 83, a valve 84, and a plurality of hydraulic cylinders 85, where each hydraulic cylinder 85 comprises a cylinder casing 86, a hydraulic ram 87 and an arm 88 extending from the hydraulic ram 87 through the end of the cylinder casing 86, where, as the hydraulic ram is adjusted by the movement of the hydraulic fluid, the arm 88 is extended and retracted.

In the hydraulic adjustment system 80, the containment means 81, hydraulic pump 83 and the valve 84 are attached to the slider 20 of commercial vehicle type two 18. The plurality of hydraulic cylinders 85 facilitates the adjustment of the airfoil 27 when positioned in any one of three locations as described below. The plurality of hydraulic hoses 82 extend from the hydraulic containment means 81 to the hydraulic pump 83, and from the hydraulic pump 83 to the valve 84. From the valve 84, the plurality of hydraulic hoses 82 extend to each end of the plurality of the hydraulic cylinders 85 such that in one operational mode hydraulic fluid flows from the valve 84 to the plurality of hydraulic cylinders 85 and the hydraulic fluid pushes the hydraulic ram 87 so that the arm 88 is extended from the cylinder casing 86, while in a second operational mode hydraulic fluid flows from the valve 84 to the plurality of hydraulic cylinders 85 and the hydraulic fluid pushes the hydraulic ram 87 so that the arm is retracted into the cylinder casing 86. The plurality of hydraulic hoses 82 also extends back to the hydraulic containment means 81 to allow hydraulic fluid to flow back to the hydraulic containment means 81.

In the first embodiment of the position of the plurality of hydraulic cylinders 85, one end 89 of each 89 of the plurality of hydraulic cylinders 85 is attached to the slider 20 of the commercial vehicle 18 between the plurality of hinges 74 and the point 90 directly above the edge opposite 75 the plurality of hinges 74 of the airfoil 73, while the end of each arm 91 that extends from the cylinder casing 86 is attached to the airfoil 73 in the area of the edge opposite 75 the plurality of hinges 74, where generally there are two hydraulic cylinders 85 and said hydraulic cylinders 85 are attached near the exterior edges 92 along the edge opposite 30 the plurality of hinges 74, but where the quantity of hydraulic cylinders 85 may vary and location of the attachment of the hydraulic cylinders 85 may vary anywhere along the edge opposite 75 the plurality of hinges 74 or between the edge opposite 75 the plurality of hinges 74 and the plurality of hinges 74.

In the second embodiment of the position of the plurality of hydraulic cylinders 85, one end 89 of each of the plurality of hydraulic cylinders 85 is attached to the Slider 20 of the commercial vehicle 18 between the point 90 directly above the edge opposite 75 the plurality of hinges 74 of the airfoil 73 and the rear wheels 77, while the end of each arm 88 that extends from the cylinder casing 86 is attached to the airfoil 73 in the area of the edge opposite 75 the plurality of hinges 74, where generally there are two hydraulic cylinders 85 and said hydraulic cylinders 85 are attached near the exterior edges 92 along the edge opposite 75 the plurality of hinges 74, but where the quantity of hydraulic cylinders 85 may vary and location of the attachment of the hydraulic cylinders 85 may vary anywhere along the edge opposite 75 the plurality of hinges 74 or between the edge opposite 75 the plurality of hinges 74 and the plurality of hinges 74.

In the third embodiment of the position of the plurality of hydraulic cylinders 85, the plurality of hinges 74 is replaced by a plurality of hydraulically adjustable hinges 93, which then adjust the angle 71 between the airfoil 73 and the underside 21 of the commercial vehicle 18.

The second embodiment of the drag reduction system 78 is operated either with a first controller 100 automatically, manually with a second controller 101 located in the driver's compartment 102 of the commercial vehicle 18, or manually with a third controller 103 located on the exterior 104 of the commercial vehicle 18 in the area of the rear wheels 77. The first controller 100 operates during regular operation of the commercial vehicle 18, where the angle 71 of the airfoil 73 is automatically adjusted according to the speed of the commercial vehicle 18. As speed increases, the angle 71 between the airfoil 73 and the underside 21 of the commercial vehicle 18 increases, adjusting the edge opposite 75 the plurality of hinges 74 of the airfoil 73 closer to the ground 11, maximizing the amount of air diverted around the rear wheels 77, thus increasing efficiency. As speed of the commercial vehicle 18 decreases, the angle 71 of the airfoil 73 decreases, decreasing efficiency but protecting the drag reduction system 78 from road hazards. The second controller 101 is a manual system that overrides the first controller 100 and allows the hydraulic adjustment system 80 to be manually adjusted by the operator from within the driver's compartment 102 of the commercial vehicle 18. An additional embodiment involves a third controller 103 located on the exterior 104 of the commercial vehicle 18 in the area of the rear wheels 77, said third controller 103 is a manual system that allows an operator to adjust the angle 71 between the airfoil 73 and the underside 21 of the commercial vehicle 18, which then raises or lowers the edge opposite 75 the plurality of hinges 74.

What is claimed:

1. An apparatus for reducing drag around the underside and rear tires of a commercial vehicle with the use of a drag reduction system comprising an airfoil located in front of the rear tire assembly;
   wherein said airfoil is attached to the underside of the commercial vehicle with the use of a plurality of hinges;
   wherein an angle between the underside of the commercial vehicle and the airfoil can be adjusted with the use of a hydraulic adjustment system wherein the hydraulic adjustment system is attached to the underside of the commercial vehicle;
   wherein the hydraulic adjustment system is operated by a plurality of controllers;
   wherein said hydraulic adjustment system comprises a hydraulic containment means, a plurality of hydraulic hoses, a hydraulic pump, a valve, and a plurality of hydraulic cylinders;
   wherein each of the plurality of hydraulic cylinders further comprise a cylinder casing, a hydraulic ram and an arm extending from the hydraulic ram through the end of the cylinder casing;
   wherein the hydraulic hoses extend from the hydraulic containment means to the hydraulic pump, from the hydraulic pump to the valve, from the valve, the plurality of hydraulic hoses extend to each end of the plurality of the hydraulic cylinders such that in one operational mode, hydraulic fluid flows from the valve to the plurality of hydraulic cylinders and the hydraulic fluid pushes the hydraulic ram so that the arm is extended from the hydraulic cylinder, while in a second operational mode, hydraulic fluid flows from the valve to the plurality of hydraulic cylinders and the hydraulic fluid pushes the hydraulic ram so that the arm is retracted into the hydraulic cylinder, and where the plurality of hydraulic hoses also extends back to the hydraulic containment means to allow hydraulic fluid to flow back to the hydraulic containment means;
   wherein each hydraulic cylinder contains a cylinder casing, a hydraulic ram and an arm extending from the hydraulic ram through the end of the cylinder casing;
   wherein, as the hydraulic ram is adjusted by the movement of the fluid, the arm is extended and retracted;
   wherein the containment means hydraulic pump, and valve are attached to the underside of the commercial vehicle; and
   wherein one end of each of the plurality of hydraulic cylinders is attached to the underside of the commercial vehicle between the plurality of hinges and a point directly above a trailing edge of the airfoil, while the end of each arm that extends from the hydraulic cylinders is attached to the airfoil in the area of an edge opposite the plurality of hinges.

2. The apparatus of claim 1 wherein the plurality of controllers further comprise a first controller and a second controller wherein the first controller is an automatic control system that adjusts the angle of the airfoil according to the speed of the vehicle such that when the airfoil is at a stop, the angle between the airfoil and the underside of the commercial vehicle is raised, when the commercial vehicle is moving the angle between the airfoil and the underside of the commercial vehicle increases, which causes the edge of the airfoil opposite of the hinges to be lowered closer to the ground; and
   wherein the second controller is located in a driver's compartment of the commercial vehicle that allows an operator to override the first controller and adjust the angle between the airfoil and the underside of the commercial vehicle manually.

3. The apparatus of claim 2 wherein there is a third controller located on an exterior of the commercial vehicle in the area of the airfoil, wherein said third controller allows an operator to override the first controller and adjust the angle between the airfoil and the underside of the commercial vehicle manually.

4. An apparatus for reducing drag around the underside and rear tires of a commercial vehicle with the use of a drag reduction system comprising an airfoil located in front of the rear tire assembly;
   wherein said airfoil being attached to the slider of the commercial vehicle with the use of a plurality of hinges such that, as the slider is adjusted the distance between the airfoil and rear wheels is maintained;
   wherein the angle between the underside of the commercial vehicle and the airfoil can be adjusted with the use of a hydraulic adjustment system;
   wherein the hydraulic adjustment system is attached to the slider; and
   wherein the adjustment system is operated by a plurality of controllers.

5. The apparatus of claim 4 wherein said adjustment system is a hydraulic system comprising a hydraulic containment means, a plurality of hydraulic hoses, a hydraulic pump, a valve, and a plurality of hydraulic cylinders;
   wherein each of the plurality of hydraulic cylinders further comprise a cylinder casing, a hydraulic ram and an arm extending from the hydraulic ram through the end of the cylinder casing;
   wherein the hydraulic hoses extend from the hydraulic containment means to the hydraulic pump, from the hydraulic pump to the valve, from the valve, the plurality of hydraulic hoses extend to each end of the plurality of the hydraulic cylinders such that in one operational mode, hydraulic fluid flows from the valve to the plurality of hydraulic cylinders and the hydraulic fluid pushes the hydraulic ram so that the arm is extended from the hydraulic cylinder, while in a second operational mode, hydraulic fluid flows from the valve to the plurality of hydraulic cylinders and the hydraulic fluid pushes the hydraulic ram so that the arm is retracted into the hydraulic cylinder, and where the plurality of hydraulic hoses also extends back to the hydraulic containment means to allow hydraulic fluid to flow back to the hydraulic containment means;

wherein each hydraulic cylinder contains a cylinder casing, a hydraulic ram and an arm extending from the hydraulic ram through the end of the cylinder casing;

wherein, as the hydraulic ram is adjusted by the movement of the fluid, the arm is extended and retracted; and wherein the containment means hydraulic pump, and valve are attached to the slider of the commercial vehicle.

6. The apparatus of claim 5 wherein one end of each of the plurality of hydraulic cylinders is attached to the slider of the commercial vehicle between the plurality of hinges and a point directly above a trailing edge of the airfoil, while the end of each arm that extends from the hydraulic cylinders is attached to the airfoil in the area of an edge opposite the plurality of hinges.

7. The apparatus of claim 5 wherein one end of each of the plurality of hydraulic cylinders is attached to the slider of the commercial vehicle between a point directly above a trailing edge of the airfoil and the rear wheels, while the end of each arm that extends from the hydraulic cylinders is attached to an airfoil in the area of the edge opposite the plurality of hinges.

8. The apparatus of claim 5 wherein each of the plurality of hydraulic cylinders is attached to the slider of the commercial vehicle at the plurality of hinges to create hydraulic adjustable hinges.

9. The apparatus according to claim 4, 5, 6, 7, or 8 wherein the first controller is an automatic control system that adjusts the angle of the airfoil according to the speed of the vehicle such that when the airfoil is at a stop, the angle between the airfoil and the underside of the commercial vehicle is raised, when the commercial vehicle is moving the angle between the airfoil and the underside of the commercial vehicle increases, which causes the edge of the airfoil opposite of the hinges to be lowered closer to the ground; and a second controller located in the driver's compartment of the commercial vehicle that allows an operator to override the first controller and adjust the angle between the airfoil and the underside of the commercial vehicle manually.

10. The apparatus of claim 9 wherein there is a third controller located on the exterior of the commercial vehicle in the area of the airfoil, said third controller allows an operator to override the first controller and adjust the angle between the airfoil and the underside of the commercial vehicle manually.

11. An apparatus for reducing drag around the underside and rear tires of a commercial vehicle with the use of a drag reduction system comprising an airfoil located in front of the rear tire assembly;

wherein said airfoil being attached to a plurality of extensions that are attached to the slider of the commercial vehicle so that as the slider is adjusted, the distance between the airfoil and the rear wheels is maintained;

wherein the airfoil is attached to the plurality of extensions with the use of a plurality of hinges;

wherein the angle between the underside of the commercial vehicle and the airfoil can be adjusted with the use of a hydraulic adjustment system; and wherein the adjustment system is operated by a plurality of controllers.

12. The apparatus of claim 11 wherein said adjustment system is a hydraulic system comprising a hydraulic containment means, a plurality of hydraulic hoses, a hydraulic pump, a valve, and a plurality of hydraulic cylinders;

wherein each of the plurality of hydraulic cylinders further comprise a cylinder casing, a hydraulic ram and an arm extending from the hydraulic ram through the end of the cylinder casing;

wherein the hydraulic hoses extend from the hydraulic containment means to the hydraulic pump, from the hydraulic pump to the valve, from the valve, the plurality of hydraulic hoses extend to each end of the plurality of the hydraulic cylinders such that in one operational mode, hydraulic fluid flows from the valve to the plurality of hydraulic cylinders and the hydraulic fluid pushes the hydraulic ram so that the arm is extended from the hydraulic cylinder, while in a second operational mode, hydraulic fluid flows from the valve to the plurality of hydraulic cylinders and the hydraulic fluid pushes the hydraulic ram so that the arm is retracted into the hydraulic cylinder, and where the plurality of hydraulic hoses also extends back to the hydraulic containment means to allow hydraulic fluid to flow back to the hydraulic containment means;

wherein each hydraulic cylinder contains a cylinder casing, a hydraulic ram and an arm extending from the hydraulic ram through the end of the cylinder casing;

wherein, as the hydraulic ram is adjusted by the movement of the fluid, the arm is extended and retracted; and wherein the containment means hydraulic pump, and valve are attached to the slider of the commercial vehicle.

13. The apparatus of claim 12 wherein one end of each of the plurality of hydraulic cylinders is attached to the plurality of extensions between the plurality of hinges and a point directly above a trailing edge of the airfoil, while the end of each arm that extends from the hydraulic cylinders is attached to the airfoil in the area of an edge opposite the plurality of hinges.

14. The apparatus of claim 12 wherein one end of each of the plurality of hydraulic cylinders is attached to the plurality of extensions between a point directly above a trailing edge of the airfoil and the rear wheels, while the end of each arm that extends from the hydraulic cylinders is attached to an airfoil in the area of the edge opposite the plurality of hinges.

15. The apparatus of claim 12 wherein each of the plurality of hydraulic cylinders is attached to the plurality of extensions at the plurality of hinges to create hydraulic adjustable hinges.

16. The apparatus according to claim 11, 12, 13, 14, or 15 wherein the first controller is an automatic control system that adjusts the angle of the airfoil according to the speed of the vehicle such that when the airfoil is at a stop, the angle between the airfoil and the underside of the commercial vehicle is raised, when the commercial vehicle is moving the angle between the airfoil and the underside of the commercial vehicle increases, which causes the edge of the airfoil opposite of the hinges to be lowered closer to the ground; and a second controller located in the driver's compartment of the commercial vehicle that allows an operator to override the first controller and adjust the angle between the airfoil and the underside of the commercial vehicle manually.

17. The apparatus of claim 16 wherein there is a third controller located on the exterior of the commercial vehicle in the area of the airfoil, said third controller allows an operator to override the first controller and adjust the angle between the airfoil and the underside of the commercial vehicle manually.

\* \* \* \* \*